US011209313B2

(12) United States Patent
Oguchi et al.

(10) Patent No.: US 11,209,313 B2
(45) Date of Patent: Dec. 28, 2021

(54) INSPECTION APPARATUS, INSPECTION SYSTEM, AND INSPECTION METHOD

(71) Applicant: Seiko Epson Corporation, Tokyo (JP)

(72) Inventors: Satoshi Oguchi, Okaya (JP); Ryohei Kuri, Matsumoto (JP); Masashi Kanai, Azumino (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 17/063,834

(22) Filed: Oct. 6, 2020

(65) Prior Publication Data

US 2021/0018367 A1   Jan. 21, 2021

Related U.S. Application Data

(63) Continuation of application No. 16/289,753, filed on Mar. 1, 2019, now Pat. No. 10,837,831.

(30) Foreign Application Priority Data

Mar. 2, 2018   (JP) .............................. JP2018-037543

(51) Int. Cl.
*G01J 3/28* (2006.01)
*G01J 3/02* (2006.01)
(Continued)

(52) U.S. Cl.
CPC ........... *G01J 3/2823* (2013.01); *G01J 3/0205* (2013.01); *G01J 3/0264* (2013.01); *G01J 3/26* (2013.01);
(Continued)

(58) Field of Classification Search
CPC ...... G01J 3/2823; G01J 3/0205; G01J 3/0264; G01J 3/26; G01J 3/51; G01J 2003/2826;
(Continued)

(56) References Cited

U.S. PATENT DOCUMENTS 9,835,492 B2   12/2017 Nishimura
2004/0135827 A1*  7/2004 Kuramata ............... G01N 21/95
                                                      345/30
(Continued)

FOREIGN PATENT DOCUMENTS

CN       1995987 B    5/2010
CN     107289847 A   10/2017
(Continued)

OTHER PUBLICATIONS

Extended European Search Report for EP Application No. 19159964.6, dated Jul. 8, 2019 (7 pages).

*Primary Examiner* — Abdullahi Nur
(74) *Attorney, Agent, or Firm* — Harness, Dickey & Pierce, P.L.C.

(57) ABSTRACT

An inspection method includes: spectroscopically separating light from a predetermined imaging range of an inspection object into light of a plurality of wavelengths and imaging spectroscopic images of each of the wavelengths; inspecting a shape of the inspection object using the spectroscopic image of a predetermined wavelength among the wavelengths imaged in the imaging of the spectroscopic images of each of the wavelengths; and inspecting a color of the inspection object using the spectroscopic images of each of the wavelengths imaged. The predetermined wavelength is determined so that a maximum light quantity of the light from the inspection object in the corresponding spectroscopic image at the predetermined wavelength is equal to or higher than maximum light quantities in the other spectroscopic images at the other wavelengths.

3 Claims, 10 Drawing Sheets

(51) Int. Cl.
*G01J 3/26* (2006.01)
*G01J 3/51* (2006.01)
*G01N 21/25* (2006.01)
*G01N 21/88* (2006.01)
G01N 21/95 (2006.01)
G01N 21/84 (2006.01)

(52) U.S. Cl.
CPC ............. *G01J 3/51* (2013.01); *G01N 21/251* (2013.01); *G01N 21/8806* (2013.01); *G01J 2003/2826* (2013.01); *G01N 2021/845* (2013.01); *G01N 2021/8845* (2013.01); *G01N 2021/9513* (2013.01)

(58) Field of Classification Search
CPC ............ G01N 21/251; G01N 21/8806; G01N 2021/8845; G01N 2021/9513; G01N 2021/845; G01N 21/95607; G01N 21/898; G01N 21/25
See application file for complete search history.

(56) References Cited

U.S. PATENT DOCUMENTS

| | | | |
|---|---|---|---|
| 2010/0091272 A1 | 4/2010 | Asada et al. | |
| 2013/0195345 A1 | 8/2013 | Nammoto et al. | |
| 2014/0218735 A1 | 8/2014 | Tatsuda | |
| 2014/0240508 A1 | 8/2014 | Gomi | |
| 2014/0267840 A1 | 9/2014 | Funamoto | |
| 2015/0185074 A1 | 7/2015 | Zhao et al. | |
| 2016/0267647 A1 | 9/2016 | Higo | |

FOREIGN PATENT DOCUMENTS

| | | |
|---|---|---|
| CN | 107741432 A | 2/2018 |
| EP | 1612527 A1 | 1/2006 |
| JP | H08-132148 A | 5/1996 |
| JP | H09-113361 A | 5/1997 |
| JP | H11-237210 A | 8/1999 |
| JP | 2000-031031 A | 1/2000 |
| JP | 2002-202265 A | 7/2002 |
| JP | 2006-170669 A | 6/2006 |
| JP | 2010-107471 A | 5/2010 |
| JP | 2010-112941 A | 5/2010 |
| JP | 2011-022681 A | 2/2011 |
| JP | 2014-153066 A | 8/2014 |
| JP | 2014-163722 A | 9/2014 |
| JP | 2015-125082 A | 7/2015 |
| JP | 2016-166842 A | 9/2016 |
| WO | 2016-043397 A1 | 3/2016 |

* cited by examiner

INSPECTION APPARATUS, INSPECTION SYSTEM, AND INSPECTION METHOD

CROSS-REFERENCE TO RELATED APPLICATIONS

This application is a continuation of U.S. patent application Ser. No. 16/289,753, filed Mar. 1, 2019, which claims priority to Japanese Patent Application No. 2018-037543, filed Mar. 2, 2018, the disclosures of which are hereby expressly incorporated by reference herein in their entireties.

BACKGROUND

1. Technical Field

The present invention relates to an inspection apparatus, an inspection system, and an inspection method.

2. Related Art

In the related art, there is known an inspection apparatus that inspects products (for example, see JP-A-2011-226814 and JP-A-2003-215053).

The inspection apparatus disclosed in JP-A-2011-226814 irradiates an inspection object with light from an illumination unit passed through a filter in which a plurality of pattern filters are overlapped and images the light reflected by the inspection object with an imaging unit (RGB camera). A filtering process of each color of RGB and a frequency filtering process are performed on the imaged image, and presence or absence of unevenness is determined from the obtained image.

The inspection apparatus disclosed in JP-A-2003-215053 images a spectroscopic image of the inspection object with a spectroscopic camera and measures a wavelength of color of every single pixel. The wavelength of each pixel is converted into a wavelength measured value, and color unevenness of the inspection object is detected.

Depending on the inspection object, it is necessary to inspect both the presence or absence of unevenness on a surface of the inspection object and the color unevenness of the inspection object. In the related art, in such a case, a step of inspecting the unevenness of the inspection object using the image imaged by the RGB camera as disclosed in JP-A-2011-226814 and a step of inspecting the color of a product using the spectroscopic measurement result of the spectroscopic camera as disclosed in JP-A-2003-215053 have been performed in separate steps. That is, the imaged image of the inspection object irradiated with pattern light used for the unevenness inspection and the spectroscopic image used for the color inspection are different images. Therefore, it is necessary to acquire images used for the respective inspections in separate steps, and there is a problem that the number of steps related to manufacturing increases.

SUMMARY

An advantage of some aspects of the invention is to provide an inspection apparatus, an inspection system, and an inspection method capable of quickly performing inspection of a plurality of items for an inspection object.

An inspection apparatus according to an application example of the invention includes: a spectroscopic imaging unit that spectroscopically separates light from a predetermined imaging range of an inspection object into light of a plurality of wavelengths and images spectroscopic images of each of the wavelengths; a shape inspection unit that inspects a shape of the inspection object using a spectroscopic image of a predetermined wavelength among the spectroscopic images of each of the wavelengths; and a color inspection unit that inspects a color of the inspection object using the spectroscopic images of each of the wavelengths.

Here, the inspection object of the application example of the invention includes an object which is provided with a light source on a rear surface of the inspection object and transmits the light from the light source (such as film) and does not need to emit illumination light from the spectroscopic imaging unit in addition to an object that emits light by self-illumination (such as display panel).

In the application example, the spectroscopic imaging unit spectroscopically separates the light from the inspection object into a plurality of wavelengths (spectral wavelengths) and images spectroscopic images for each of the spectral wavelengths, respectively, and the shape inspection unit performs the shape inspection of the inspection object using any one of the imaged spectroscopic images. The color inspection unit performs the color inspection of the inspection object using the plurality of imaged spectroscopic images.

That is, in the application example, the spectroscopic image of the inspection object which emits light by self-illumination or transmits light from a rear surface is imaged so that, in a case where the inspection object has an abnormality such as scratch on a surface or adhesion of a foreign substance, a light quantity is changed due to the scattering of light at the abnormality portion. Accordingly, the shape inspection unit can easily perform the shape inspection based on any one of the imaged spectroscopic images without emitting illumination light having a specific pattern such as a fringe pattern with respect to the inspection object. Since spectroscopic images for the plurality of spectral wavelengths can be obtained, the color inspection unit can obtain spectrum at each position of the inspection object from these spectroscopic images and perform color measurement (color inspection) with high accuracy.

In the application example, both the shape inspection by the shape inspection unit and the color inspection by the color inspection unit are performed using the spectroscopic images imaged by the spectroscopic imaging unit. Accordingly, there is no need to acquire the image for performing the shape inspection and the image for performing the color inspection at separate processes, and the number of processes related to the inspection can be reduced.

In the inspection apparatus according to the application example, it is preferable that the spectroscopic imaging unit includes a variable wavelength interference filter that includes a pair of reflection films opposite to each other and a gap changing unit which changes a gap size between the pair of reflection films, and an imaging element that images light transmitted through the variable wavelength interference filter.

In the application example with this configuration, the spectroscopic imaging unit includes the variable wavelength interference filter and an imaging device. The variable wavelength interference filter has a simple configuration in which a pair of reflection films are disposed opposite to each other, and for example, can be reduced in size and weight compared to spectroscopic filters such as an acousto-optic tunable filter (AOTF) or a liquid crystal tunable filter (LCTF). Accordingly, the freedom degree of the disposition space of the spectroscopic imaging unit is improved, so that it is possible to dispose the spectroscopic imaging unit at any position in a manufacturing factory and the like. It is also possible to easily hold the spectroscopic imaging unit with a robot arm or the like.

In the inspection apparatus according to the application example, it is preferable that an imaging holding arm that holds the spectroscopic imaging unit and is relatively movable with respect to the inspection object is further included.

In the application example with this configuration, the spectroscopic imaging unit is held by the imaging holding arm, and the imaging holding arm is relatively movable with respect to the inspection object. Therefore, it is possible to move the spectroscopic imaging unit with respect to the inspection object, and it is possible to image an image of the inspection object from any directions.

In the inspection apparatus according to the application example, it is preferable that the spectroscopic imaging unit is held by the imaging holding arm via a buffer material.

As described above, in a case where the spectroscopic imaging unit is held by the imaging holding arm movable with respect to the inspection object, the vibration according to the driving of the imaging holding arm may be transmitted to the spectroscopic imaging unit. On the other hand, in the application example, since the spectroscopic imaging unit is held by the imaging holding arm via a buffer material, the transmission of the vibration from the imaging holding arm to the spectroscopic imaging unit can be suppressed, and thereby the spectral accuracy can be improved.

In the inspection apparatus according to the application example, it is preferable that a transport arm that transports the inspection object is further included, and in which the transport arm has a gripping portion that grips the inspection object, and an imaging holding portion that holds the spectroscopic imaging unit at a position opposite to the inspection object gripped by the gripping portion.

In the application example with this configuration, it is possible to grip the inspection object by the gripping portion of the transport arm and transport the inspection object to the predetermined position. The transport arm includes the imaging holding portion which holds the spectroscopic imaging unit at a position opposed to the inspection object gripped by the gripping portion. Therefore, it is possible to image the spectroscopic image of the inspection object by the spectroscopic imaging unit by the transport arm while transporting the inspection object.

In the inspection apparatus according to the application example, it is preferable that the spectroscopic imaging unit is held by the imaging holding portion via a buffer material.

As described above, while the inspection object is gripped to be transported by the transport arm, in a case where the spectroscopic image of the inspection object is imaged by the spectroscopic imaging unit, the vibration caused by the driving of the transport arm may be transmitted to the spectroscopic imaging unit. On the other hand, in the application example, since the spectroscopic imaging unit is holding the imaging holding portion via a buffer material, the transmission of the vibration from the transport arm to the spectroscopic imaging unit can be suppressed, and thereby the spectral accuracy can be improved.

In the inspection apparatus according to the application example, it is preferable that a transport arm that transports the inspection object, a transport controller that controls driving of the transport arm, and a vision controller that is provided with a spectroscopic control unit which controls the spectroscopic imaging unit, the shape inspection unit, and the color inspection unit are further included.

In the application example with this configuration, the transport arm which transports the inspection object is provided at the inspection apparatus so that the driving of the transport arm is controlled by the transport controller. In the inspection apparatus, the vision controller is provided as a separate portion from the transport controller, and the spectroscopic control unit which controls the spectroscopic imaging unit, the shape inspection unit, and the color inspection unit are provided in the vision controller.

The versatility is enhanced by controlling the transport control of the transport arm by the transport controller and the inspection of the inspection object by the vision controller with separate configuration, and thereby the inspection apparatus is applicable to various manufacturing lines.

In the inspection apparatus according to the application example, it is preferable that the transport controller controls the driving of the transport arm based on an input signal input from the vision controller and transports the inspection object to a position according to a shape inspection result of the shape inspection unit and a color inspection result of the color inspection unit.

In the application example with this configuration, both the shape inspection and the color inspection are performed based on the spectroscopic image obtained by imaging the spectroscopic image by the spectroscopic imaging unit, and thereby, the shape inspection result and the color inspection result can be quickly obtained. Accordingly, when the input signal including the inspection result is input from the vision controller, the transport controller can quickly transport the inspection object to the position according to the inspection result.

In the inspection apparatus according to the application example, it is preferable that the transport controller transports the inspection object to a first transport position in a case where a defect having a predetermined size or larger is detected by the shape inspection unit, transports the inspection object to a second transport position in a case where a defect having the predetermined size or larger is not detected by the shape inspection unit and chromaticity detected by the color inspection unit is out of a predetermined reference range, and transports the inspection object to a third transport position in a case where a defect having the predetermined size or larger is not detected by the shape inspection unit and chromaticity detected by the color inspection unit is within the reference range.

In the application example with this configuration, in a case where a defect having a predetermined size or larger is detected in the shape inspection result of the shape inspection unit, the transport controller transports the inspection object to the first transport position for determining the inspection object as a defective product, for example. In a case where no defect is detected in the shape inspection result of the shape inspection unit and the chromaticity is inspected to be out of the predetermined reference range by the color inspection unit (in a case where it is determined that there is an abnormality in color), the transport controller transports the inspection object to the second transport position for determining the inspection object as a correction target, for example. In a case where no defect is detected in the shape inspection result of the shape inspection unit and it is determined that there is no abnormality in color by the color inspection unit, the transport controller transports the inspection object to the third transport position for determining the inspection object as a good product, for example. In the application example, the inspection object can be efficiently classified based on the inspection result of the shape inspection unit and the color inspection unit.

In the inspection apparatus according to the application example, it is preferable that a reference object with known optical properties with respect to a wavelength of the light spectroscopically separated by the spectroscopic imaging unit is further included.

In the application example with this configuration, since the reference object is provided, the calibration of the spectroscopic imaging unit can be performed prior to the imaging process of the spectroscopic image of the inspection object by the spectroscopic imaging unit, and a spectroscopic image with high accuracy can be obtained.

In the inspection apparatus according to the application example, it is preferable that the shape inspection unit inspects the shape using the spectroscopic image of a shortest wavelength among the spectroscopic images of each of the wavelengths.

In a case where there is unevenness (defect) such as a scratch on the surface of the inspection object, since the light is scattered by the unevenness when the inspection object is self-illuminated, when the spectroscopic image is imaged, the luminance of the unevenness portion is higher than the other portions. In the shape inspection unit of the application example, it is possible to inspect whether or not there is an abnormality in the shape of the inspection object by detecting such a light scattering position. At this time, the shape inspection unit performs the shape inspection using the spectroscopic image of the shortest wavelength among the plurality of spectroscopic images. In a case where light is scattered by the unevenness on the surface of the inspection object, the shorter the wavelength of the light, the higher the light intensity of the scattered light. Accordingly, the shape inspection unit can detect the unevenness on the surface of the inspection object with high accuracy by performing the shape inspection by the spectroscopic image of the shortest wavelength.

In the inspection apparatus according to the application example, the shape inspection unit may inspect the shape using the spectroscopic image corresponding to a wavelength at which a light quantity of the light from the inspection object peaks.

The shape inspection unit of the application example performs the shape inspection using the spectroscopic image corresponding to the wavelength at which the light quantity peaks when the inspection object emits light among the plurality of spectroscopic images. With such a wavelength, the light quantity of the light received by the spectroscopic imaging unit is large, and in a case where the scattering of light occurs, the light quantity of the scattered light may increase. Therefore, the shape inspection unit can detect the unevenness on the surface of the inspection object with high accuracy.

An inspection system according to another application example of the invention includes the above-described inspection apparatus and a transport mechanism that transports the inspection object inspected by the inspection apparatus to a predetermined position.

In the application example, as described above, there is no need to image an image for the shape inspection and an image for the color inspection separately. That is, it is possible to perform both the shape inspection and the color inspection using the spectroscopic images of each of the wavelengths imaged by the spectroscopic imaging unit, that is, the spectroscopic image for the color inspection. Therefore, the shape inspection and the color inspection with respect to the inspection object can be performed quickly, and it is possible to quickly transport the inspection object to the predetermined position according to the inspection result.

In the inspection system according to the application example, it is preferable that a display correction unit that corrects a display color of an image displayed on the inspection object in a case where the inspection object displays the image by self-illumination is further included and in which the transport mechanism transports the inspection object to the display correction unit in a case where a defect having a predetermined size or larger is not detected by the shape inspection unit and chromaticity detected by the color inspection unit is out of a predetermined reference range.

In the application example with this configuration, in a case where the inspection object is an object to display an image such as a display panel, when the color inspection unit determines that there is an abnormality in the display color, the inspection object is transported to the display correction unit by the transport mechanism. Accordingly, it is possible to correct the color of the image on the display panel to a correct color.

An inspection method according to another application example of the invention includes: spectroscopically separating light from a predetermined imaging range of an inspection object into light of a plurality of wavelengths and imaging spectroscopic images of each of the wavelengths; inspecting a shape of the inspection object using a spectroscopic image of a predetermined wavelength among the spectroscopic images of each of the wavelengths imaged in the imaging of the spectroscopic images of each of the wavelengths; and inspecting a color of the inspection object using the spectroscopic images of each of the wavelengths imaged in the imaging of the spectroscopic images of each of the wavelengths.

In the application example, similarly to the above-described application example, using the spectroscopic images imaged by imaging the spectroscopic images of each of the wavelengths, and performing the inspecting a shape of the inspection object and the inspecting a color of the inspection object. Accordingly, there is no need to acquire the image for performing the shape inspection and the image for performing the color inspection at separate processes, and the number of processes related to the inspection can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

The first embodiment will be described below.

In the first embodiment, an inspection line (inspection system) provided in a portion of a manufacturing line of a display panel (inspection object) which is a product in a display panel manufacturing factory will be described. In the inspection line of the present embodiment, it is inspected whether there is a defect such as a scratch on the display panel manufactured in a processing and assembly line of the manufacturing line and whether there is any abnormality in the display performance (color of displayed image) of the display panel. In the inspection line, in a case where there is a defect such as a scratch on the display panel, the display panel is classified as a defective product, and in a case where there is no defect such as a scratch on the display panel, but there is an abnormality in the color of the displayed image, the display panel is classified as a correction target product. The display panel in which there is no defect such as a scratch and the display color is normal is classified as a good product.

Hereinafter, a specific configuration of such an inspection line will be described.

1. Overall Configuration of Inspection Line 1

Figure 1:
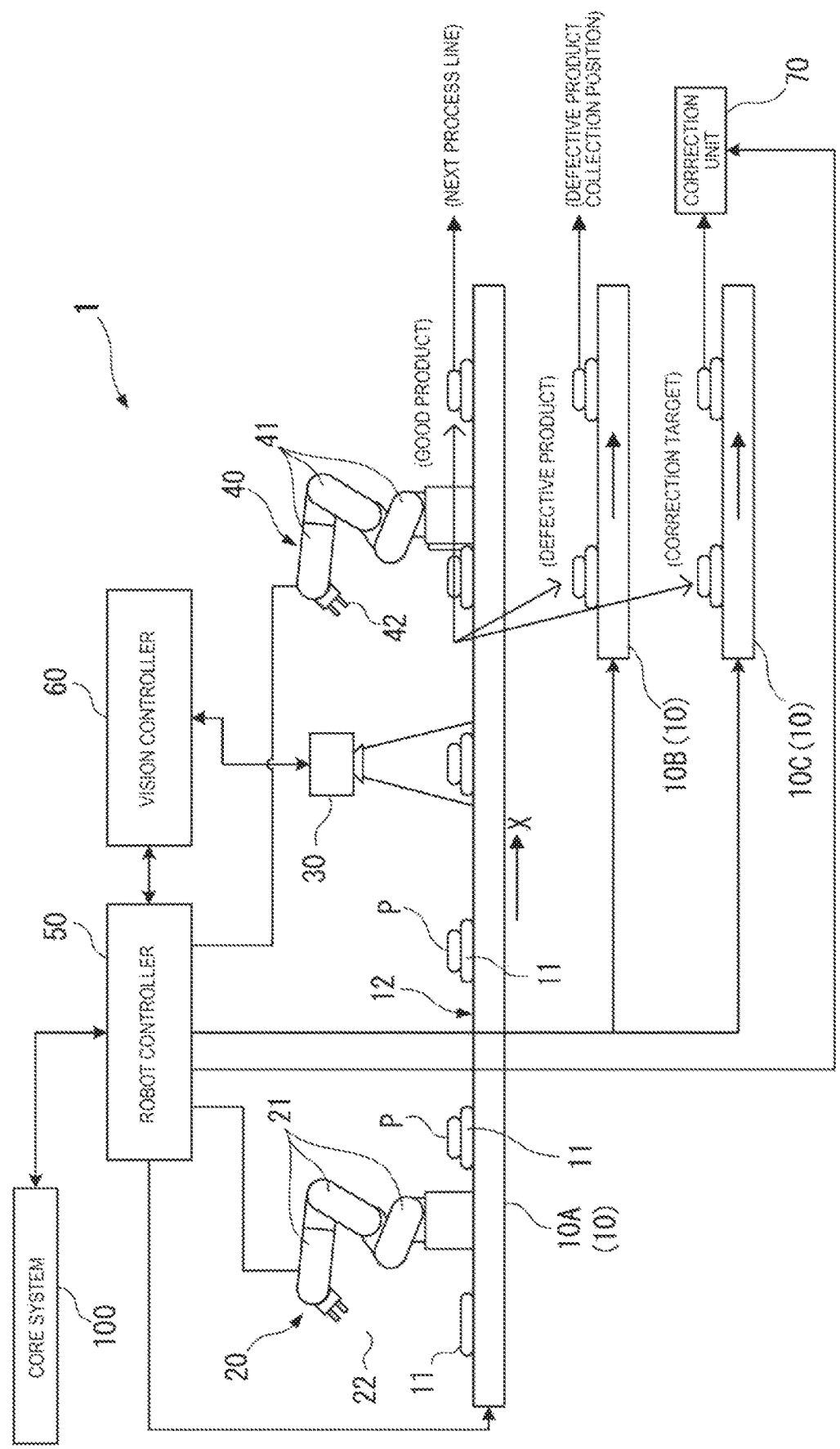
FIG. 1 is a view showing a schematic configuration of an inspection line according to a first embodiment.

FIG. 1 is a view showing a schematic configuration of an inspection line 1 according to a first embodiment.

As shown in FIG. 1, the inspection line 1 which is an inspection system includes a belt conveyor 10, a first transport arm 20, a spectroscopic camera 30, a second transport arm 40, a robot controller 50 (transport controller), a vision controller 60, and a correction unit 70.

In the present embodiment, a display panel P as an inspection object is assumed to be powered on, self-illuminated with a backlight turned on, and transported to the inspection line 1 in a state in which a predetermined pattern image is displayed. The pattern image may be, for example, an image of a single color (for example, white) or a pattern image in which a display area of the display panel P is divided into a plurality of areas and different colors are displayed in each area.

Here, the spectroscopic camera 30, the second transport arm 40, the robot controller 50, and the vision controller 60 constitute the inspection apparatus according to the invention. The belt conveyor 10 and the first transport arm 20 constitute a transport mechanism according to the invention.

1-1. Belt Conveyor 10

In the belt conveyor 10, for example, a pedestal portion 11 is disposed at a constant interval and these pedestal portions 11 are transported in a first transport direction X.

In the present embodiment, an inspect transport portion 10A, a first transport portion 10B (first transport position), and a second transport portion 10C (second transport position) are provided as the belt conveyor 10 provided in the inspection line 1.

The inspect transport portion 10A transports the display panel P manufactured by the processing and assembly line (not shown) in the first transport direction X.

The first transport portion 10B transports the defective display panel P to a predetermined defect collection position.

The second transport portion 10C transports the display panel P to be color-corrected to the correction unit 70 (display correction unit).

In the present embodiment, an example in which the pedestal portion 11 and the display panel P are transported by the belt conveyor 10 is described, but is not limited thereto. A configuration in which the belt conveyor 10 is not provided and the display panel P is sequentially transported to the pedestal portion 11 disposed at a predetermined interval by a plurality of transport arms may be adopted.

In the present embodiment, a configuration in which the belt conveyor provided in the processing and assembly line and the belt conveyor 10 provided in the inspection line 1 are different is described as an example. However, a configuration in which the display panel P is transported from the processing and assembly line to the inspection line 1 by a single belt conveyor 10 may be adopted.

1-2. First Transport Arm 20

The first transport arm 20 is disposed at a predetermined position in the first transport direction X.

As shown in FIG. 1, the first transport arm 20 is an articulated robot arm in which a plurality of arm portions 21 are rotatably connected to each other. A pick-up portion 22 for picking up the display panel P is provided at the tip end portion of the first transport arm 20.

The first transport arm 20 picks up the display panel P manufactured by the processing and assembly line and transported to a predetermined position and places the display panel on the pedestal portion 11 on the belt conveyor 10. As described above, in the case where the same belt conveyor 10 is used for the processing and assembly line and the inspection line, the first transport arm 20 may not be disposed.

1-3. Spectroscopic Camera 30

The spectroscopic camera 30 is a spectroscopic imaging unit according to the invention and is disposed, for example, at a position between the first transport arm 20 and the second transport arm 40 facing the belt conveyor 10. That is, the spectroscopic camera 30 of the present embodiment is fixed at a predetermined position in the first transport direction X, and the imaging direction of the spectroscopic camera 30 is directed to an upper surface (transport surface 12) of the belt conveyor 10. Here, the spectroscopic camera 30 is disposed in a normal direction of the upper surface (transport surface 12) of the belt conveyor 10 and may image the display panel P from the normal direction, and may image the display panel P from a direction inclined at a predetermined angle with respect to the normal direction of the transport surface 12. In the present embodiment, since illumination light is not emitted from the spectroscopic camera 30 toward the display panel P, the illumination light specularly reflected on the surface of the display panel P cannot be imaged by the spectroscopic camera 30.

Figure 2:
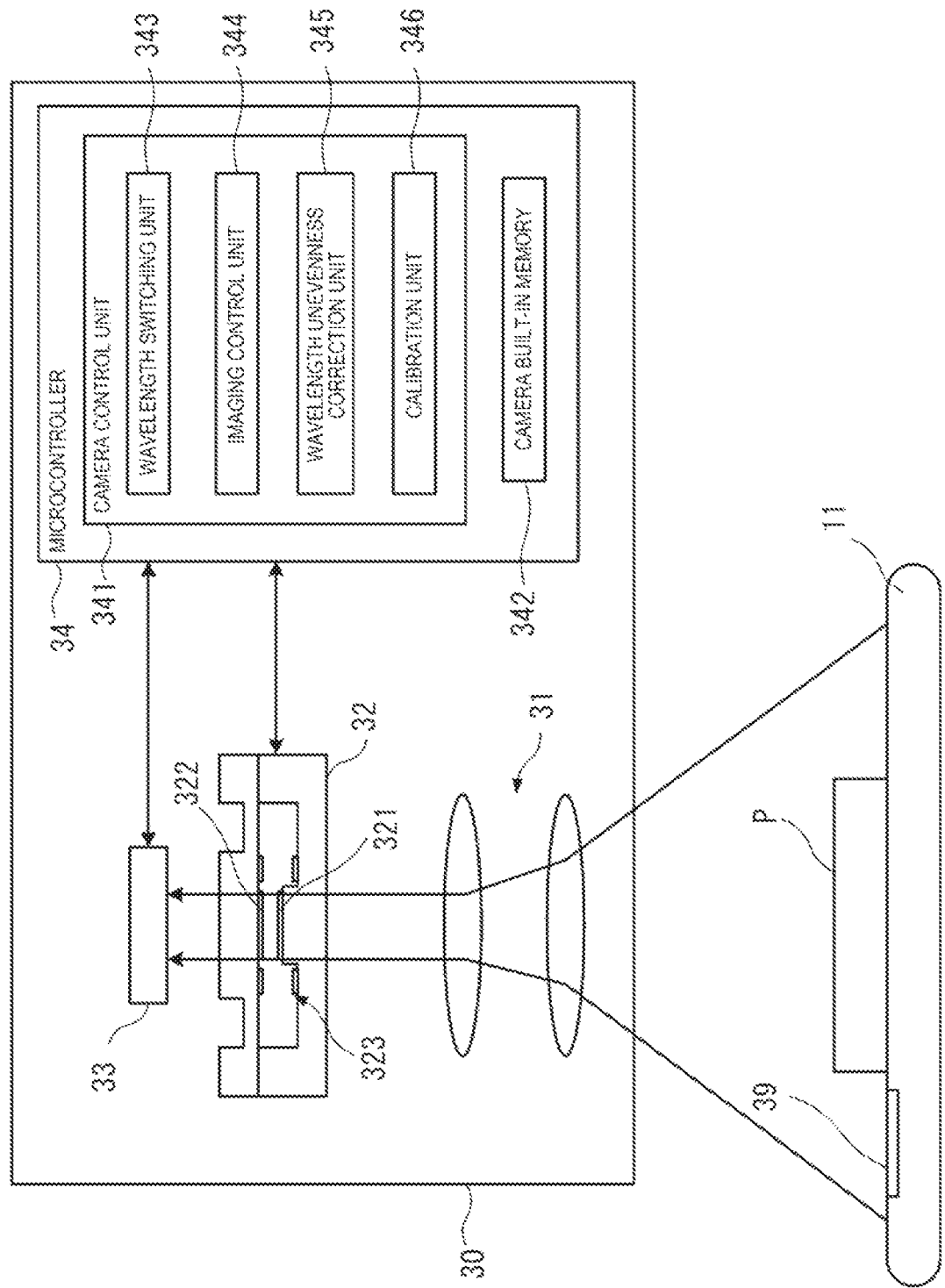
FIG. 2 is a schematic diagram showing a schematic configuration of a spectroscopic camera of the first embodiment.

FIG. 2 is a schematic diagram showing the schematic configuration of the spectroscopic camera 30 of the present embodiment.

As shown in FIG. 2, the spectroscopic camera 30 includes an incident optical system 31, a variable wavelength interference filter 32, an imaging element 33, and a microcontroller 34. A reference object 39 for performing calibration of the spectroscopic camera 30 is provided within an image range that can be imaged by the spectroscopic camera 30 or within the imaging range in a forward and backward movable manner.

The incident optical system 31 is composed of, for example, a telecentric optical system or the like, and guides incident light to the variable wavelength interference filter 32 and the imaging element 33 so that an optical axis and a principal ray are parallel or substantially parallel. When the display panel P placed on the pedestal portion 11 is transported to a predetermined imaging position by the belt conveyor 10, the incident optical system 31 is configured so that the image light from the entire area of the display panel P is imaged by the imaging element 33. That is, the entire area of the display panel P becomes the imaging range according to the invention, and the spectroscopic image of the entire display panel P is imaged by the spectroscopic camera 30.

The variable wavelength interference filter 32 is a Fabry Perot etalon filter, and includes a pair of reflection films 321 and 322 opposite to each other and a gap changing unit 323 (for example, electrostatic actuator) capable of changing the distance between the reflection films 321 and 322. In the variable wavelength interference filter 32, the wavelength (spectral wavelength) of the light through which transmits the reflection films 321 and 322 can be changed by controlling the voltage applied to the gap changing unit 323.

The imaging element 33 is a device for imaging image light transmitted through the variable wavelength interference filter 32, and consists of, for example, an image sensor such as a charge coupled device (CCD) and a complementary metal oxide semiconductor (CMOS). In the spectroscopic camera 30 of the present embodiment, the light transmitted through the variable wavelength interference filter 32 is incident on each pixel of the imaging element 33. For this reason, it is possible to image a spectroscopic image with a higher resolution than, for example, an RGB camera that forms one pixel of image data with a plurality of imaging pixels.

The microcontroller 34 is an integrated circuit including a camera control unit 341 including a central processing unit (CPU) core and the like, a camera built-in memory 342, and the like. The microcontroller 34 reads and executes a computer program recorded in the camera built-in memory 342 by the camera control unit 341, and thereby functions as a wavelength switching unit 343, an imaging control unit 344, a wavelength unevenness correction unit 345, and a calibration unit 346.

In the camera built-in memory 342, a drive table in which a command value to be input to the gap changing unit 323 is recorded with respect to the wavelength of the light transmitted through the variable wavelength interference filter 32 is recorded.

The wavelength switching unit 343 changes the command value to be input to the gap changing unit 323 of the variable wavelength interference filter 32 based on the drive table.

The imaging control unit 344 controls the imaging element 33 to acquire a light receiving signal (spectral information) output from each imaging pixel of the imaging element 33, and thereby obtains the spectroscopic image.

The wavelength unevenness correction unit 345 corrects wavelength unevenness of the imaged image.

For example, a wavelength (wavelength unevenness data) of light received by each imaging pixel of the imaging element 33 when the size of the gap between the pair of reflection films 321 and 322 of the variable wavelength interference filter 32 is set to a plurality of sizes is measured and stored in the camera built-in memory 342 in advance.

After sequentially switching the wavelength of the light transmitted through the variable wavelength interference filter 32 and imaging the spectroscopic image for each wavelength with the imaging element 33, the wavelength unevenness correction unit 345 corrects each imaged image using the wavelength unevenness data. For example, the wavelength unevenness correction unit 345 calculates the spectrum for each pixel and calculates the light quantity for the predetermined wavelength from the calculated spectrum. Accordingly, even in a case where unevenness occurs in the wavelength of light received by each imaging pixel in each spectroscopic image, it is possible to obtain a highly accurate spectroscopic image in which the wavelength unevenness is corrected.

The calibration unit 346 inspects whether or not the light transmitted through the variable wavelength interference filter 32 is the light of the target of the wavelength by imaging the reference object 39 with the spectroscopic camera 30 and in a case where it is different, the correction process is performed.

In the present embodiment, an object of which the optical property with respect to the target wavelength is already known is used as the reference object 39. For example, a wavelength absorption plate of which the light absorption rate with respect to a plurality of spectral wavelengths to be imaged by the spectroscopic camera 30 is already known or a reflection plate which has the peak value of the reflection rate with respect to the spectral wavelength is used.

Accordingly, the calibration unit 346 can determine whether or not the light of each spectral wavelength is normally transmitted through the variable wavelength interference filter 32 based on the drive table when the gap changing unit 323 is controlled. The drive table is corrected by adjusting the command value to be input to the gap changing unit 323 and searching the command value corresponding to the peak absorption wavelength (peak reflection wavelength) of the reference object 39.

The reference object 39 may be set at a position within the imaging range of the spectroscopic camera 30. For example, the reference object 39 may be provided so as to freely advance and retract in the imaging range of the spectroscopic camera 30 and advanced into the imaging range when performing the calibration of the spectroscopic camera 30. As shown in FIG. 2, the reference object 39 may be provided at a portion of the pedestal portion 11. Alternatively, the reference object 39 may be provided at a portion (for example, a portion of pick-up portion 42) of the second transport arm 40.

1-4. Second Transport Arm 40

The second transport arm 40 is provided on a downstream side of a position where the spectroscopic camera 30 is disposed in the first transport direction X.

The second transport arm 40 is an articulated robot arm similar to the first transport arm 20 which includes a plurality of arm portions 41 rotatably connected to each other and a pick-up portion 42.

The second transport arm 40 transports the display panel P to a predetermined transport line based on the control of the robot controller 50. In the present embodiment, in a case where there is a defect such as a scratch on the display panel P, the second transport arm 40 transports the display panel P to the first transport portion 10B (first transport position). In a case where there is an abnormality in the display color of the display panel P, the second transport arm 40 transports the display panel P to the second transport portion 10C (second transport position). On the other hand, in a case where there is no defect on the shape of the display panel P and no abnormality in the display color, the display panel P is not picked up by the second transport arm 40 and is transported to a line for performing next process (for example, rapping process) as it is along the inspect transport portion 10A (third transport position).

1-5. Robot Controller 50

Figure 3:
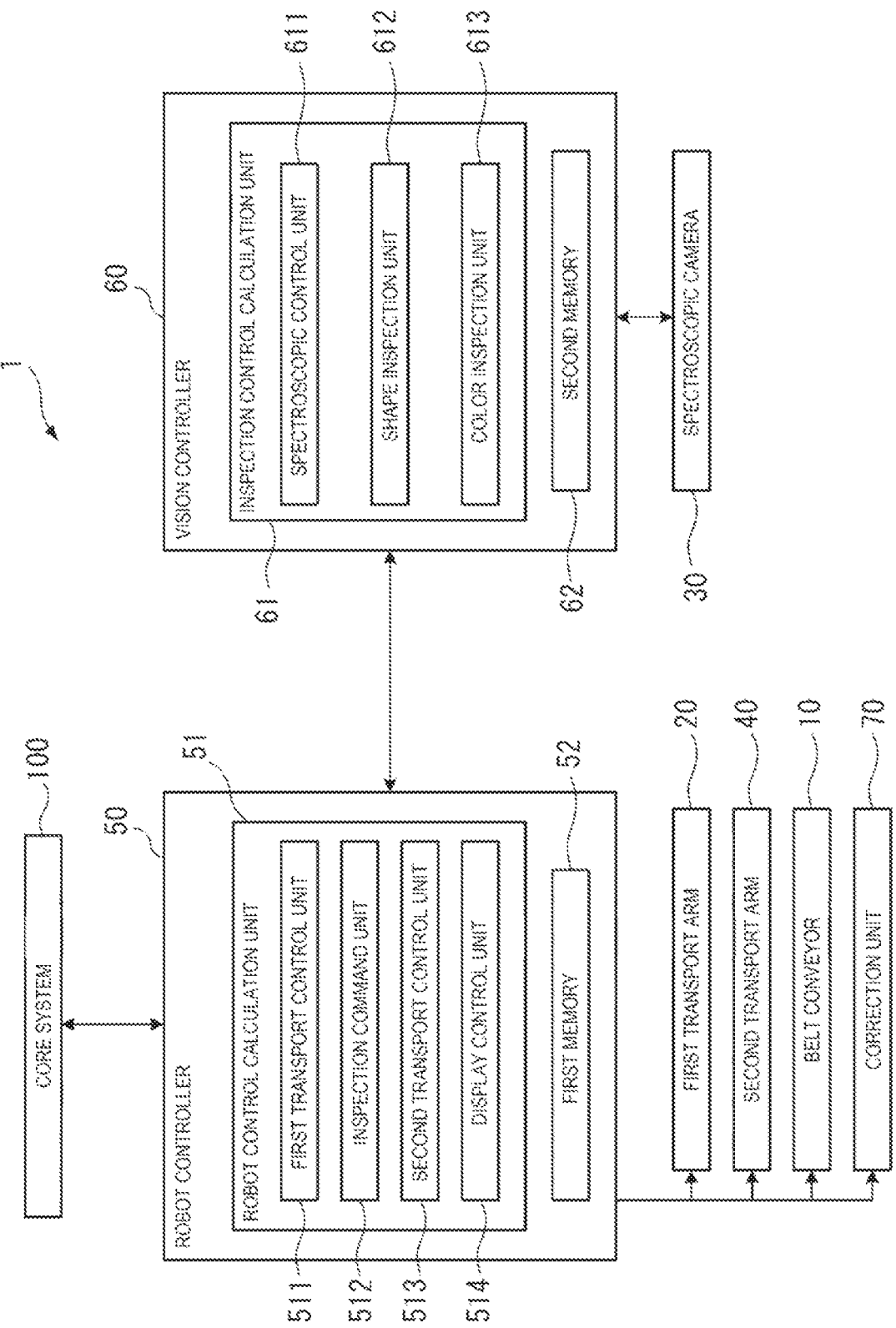
FIG. 3 is a block diagram showing a functional configuration of the inspection line of the first embodiment.

FIG. 3 is a block diagram showing a functional configuration of the inspection line 1 of the present embodiment.

The robot controller 50 is connected to each drive system of a core system 100 for managing the manufacture of a product, the first transport arm 20, the second transport arm 40, and the belt conveyor 10 (inspect transport portion 10A, first transport portion 10B, and second transport portion 10C).

The robot controller 50 includes a robot control calculation unit 51 configured by CPU and a first memory 52. When the computer program stored in the first memory 52 is read and executed, the robot control calculation unit 51 functions as a first transport control unit 511, an inspection command unit 512, a second transport control unit 513, and a display control unit 514.

The robot controller 50 starts the inspection of the display panel P as a command signal to start the inspection of the display panel P is input from the core system 100.

When the inspection of the display panel P is started, the first transport control unit 511 controls the belt conveyor 10 and the first transport arm 20 to pick up the transported display panel P from the processing and assembly line and places the display panel P on the pedestal portion 11.

The inspection command unit 512 commands the vision controller 60 to start the inspection on the display panel P and receives an input signal (inspection result information) from the vision controller 60. The inspection result information includes a shape inspection result indicating the presence or absence of a defect on the display panel P and a color inspection result indicating the presence or absence of abnormality in the display color. The inspection command unit 512 receives a spectroscopic image with respect to each wavelength imaged with the spectroscopic camera 30 or a display image as an input signal in addition to the inspection result information. The inspection command unit 512 transmits the received inspection result information to the core system 100. Accordingly, the inspection result is recorded as log data in a data storage device (not shown) connected to the core system 100.

The second transport control unit 513 controls the second transport arm 40 and the belt conveyor 10 based on the inspection result received from the vision controller 60. That is, in a case where an inspection result indicating that there is a defect in the shape of the display panel P is input from the vision controller 60, the second transport control unit 513 controls the second transport arm 40 and transports the display panel P to the first transport portion 10B. In a case where an inspection result indicating that there is an abnormality in the display color of the display panel P is input from the vision controller 60, the second transport control unit 513 controls the second transport arm 40 and transports the display panel P to the second transport portion 10C. On the other hand, in a case where an inspection result indicating that the display color of the display panel P is normal is input from the vision controller 60, the second transport control unit 513 transports the display panel P placed on the pedestal portion 11 as it is along the inspect transport portion 10A.

The display control unit 514 displays an image (such as spectroscopic image and display image) transmitted from the vision controller 60 on a display (not shown).

Accordingly, it is possible to check whether or not the inspection is normally performed by a manager managing the inspection line 1 visually checking the display.

1-6. Vision Controller 60

The vision controller 60 is connected to the spectroscopic camera 30 and the robot controller 50 to perform the inspection of the display panel P based on the inspection command from the robot controller 50. The vision controller 60 may be connected to the core system 100, and in such a case, the inspection result from the vision controller 60 may be transmitted to the core system 100 and recorded as log data.

As shown in FIG. 3, the vision controller 60 includes an inspection control calculation unit 61 configured by CPU and the like and a second memory 62. When the computer program stored in the second memory 62 is read and executed, the inspection control calculation unit 61 functions as a spectroscopic control unit 611, a shape inspection unit 612, and a color inspection unit 613.

The spectroscopic control unit 611 controls the spectroscopic camera 30 to image the spectroscopic images of a plurality of wavelength with respect to the display panel P.

The shape inspection unit 612 inspects the shape of the surface of the display panel P based on the spectroscopic image obtained from the spectroscopic camera 30. Specifically, the shape inspection unit 612 inspects whether or not there is a defect caused by the unevenness such as a scratch on the surface of the display panel P. The shape inspection unit 612 may further inspect whether or not there is any adhesion of a foreign substance in addition to the inspection of the defect.

In the shape inspection executed by the shape inspection unit 612, the inspection is performed based on the spectroscopic image of the predetermined wavelength among the spectroscopic images of the plurality of wavelengths imaged by the spectroscopic camera 30. It is preferable to use a spectroscopic image having the shortest wavelength as the spectroscopic image to be used. That is, in a case where there is unevenness on the display panel P, the light is scattered due to the unevenness and the luminance value at the edge portion of the unevenness is higher than the other portions when the display panel P emits light. At this time, the scattered light becomes stronger at shorter wavelength, it is possible to detect the unevenness where the light is scattered with high accuracy by using the spectroscopic image of short wavelength.

The detection method of a shape defect by the shape inspection unit 612 is not particularly limited. For example, the shape inspection unit 612 calculates the luminance value between adjacent pixels along a horizontal direction and a vertical direction of the spectroscopic image and performs edge detection for detecting the portion in which the variation value of luminance value is equal to or higher than a predetermined value as the edge portion. In addition, any method such as edge detection using Canny method, edge detection using secondary differentiation (Laplacian filter), and the like may be used.

The color inspection unit 613 performs color inspection on the display panel P based on the plurality of spectroscopic images transmitted from the spectroscopic camera 30. That is, the color inspection unit 613 determines whether or not the chromaticity of the display panel P is out of the reference range.

Specifically, the color inspection unit 613 compares the color of each pixel of the pattern image displayed on the display panel P with the color (reference color information) of each pixel on the original image data of the pattern image, and determines whether or not the color displayed on the display panel P is normal or the color unevenness occurs. In this, the color inspection unit 613 converts the signal value (spectral information) of each pixel of each spectroscopic image to color information of a predetermined color system (such as L*a*b*color system) and generates a conversion image. The conversion image becomes a display image to be displayed on the display by the display control unit 514. The color inspection unit 613 calculates the difference (color difference ΔE) between the calculated color information and the reference color information with respect to each pixel and determines whether or not the color difference ΔE is within an allowable value.

1-7. Correction Unit 70

The correction unit 70 is provided at a transport destination on the second transport portion 10C. The correction unit 70 performs color correction of the display panel P transported to the second transport portion 10C, that is, the display panel P determined to have an abnormality in the display color by the color inspection unit 613.

Specifically, the correction unit 70 is composed of a computer and has a connecting portion connectable to the transported display panel P. The display panel P transported along the second transport portion 10C is connected to the connecting portion by a robot arm (not shown) and is communicable with the correction unit 70. The correction unit 70 corrects a display profile of each pixel of the display panel P based on the color difference ΔE calculated from the inspection by the color inspection unit 613.

2. Inspection Method of Display Panel P in Inspection Line 1

Next, the inspection method of the display panel P in the above-described inspection line 1 will be described.

Figure 4:
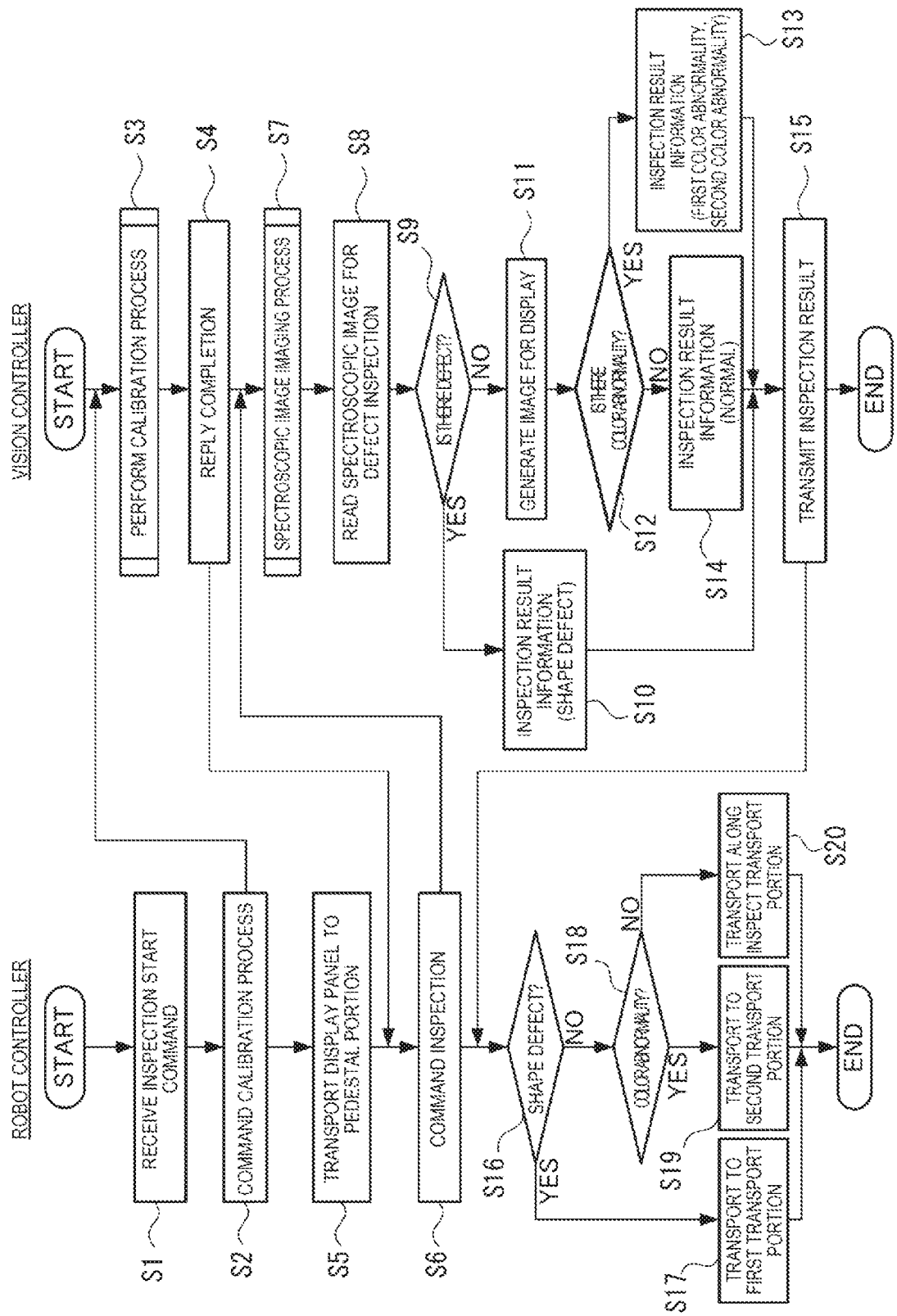
FIG. 4 is a flowchart showing an inspection method in the inspection line of the first embodiment.

FIG. 4 is a flowchart showing an inspection method in the inspection line 1.

In the inspection line 1 of the present embodiment, the robot controller 50 receives a command signal indicating the start of the inspection of the display panel P from the core system 100 (step S1).

Accordingly, the robot controller 50 commands the vision controller 60 to perform the calibration process of the spectroscopic camera 30 (step S2). At this time, the robot controller 50 moves the reference object 39 into the imaging range of the spectroscopic camera 30. For example, in a case where the reference object 39 is provided at a portion of the pedestal portion 11, the robot controller 50 drives the belt conveyor 10 to move the pedestal portion 11 into the imaging range of the spectroscopic camera 30.

When the calibration of the spectroscopic camera 30 is commanded, the vision controller 60 controls the spectroscopic camera 30 to perform the calibration process (step S3).

Figure 5:
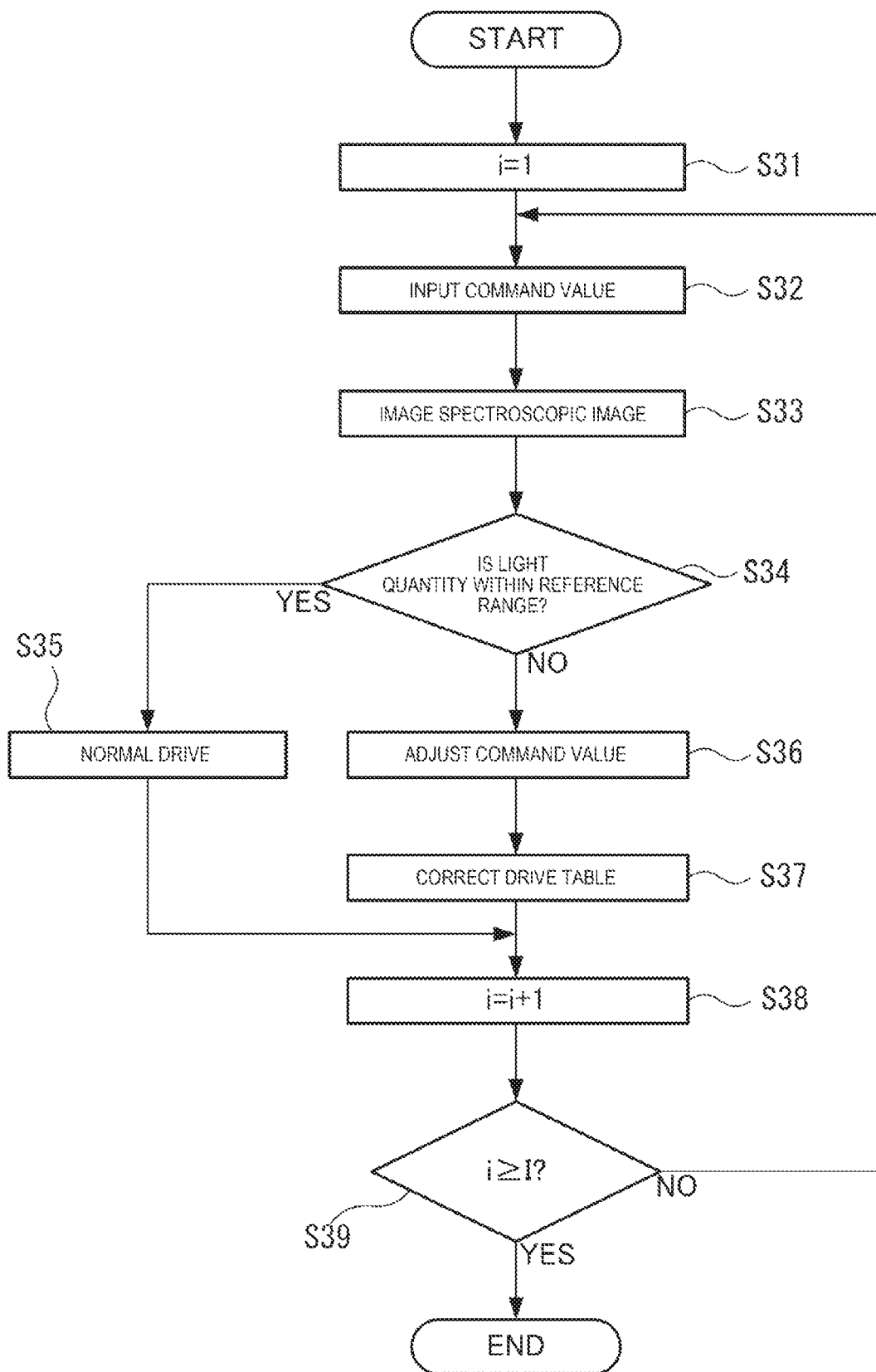
FIG. 5 is a flowchart showing a process of step S3 in FIG. 4.

FIG. 5 is a flowchart showing the calibration process in step S3.

In the calibration process of the spectroscopic camera 30, the wavelength switching unit 343 first initializes (i=1) a variable i (step S31). Here, the variable i is a variable related to the wavelength which transmits through the variable wavelength interference filter 32, and the target wavelength from i=1 to i=I and the command value corresponding to the target wavelength are recorded in the drive table.

The wavelength switching unit 343 reads the command value corresponding to the variable i from the drive table and inputs the command value to the gap changing unit 323 of the variable wavelength interference filter 32 (step S32). Furthermore, the imaging control unit 344 controls the imaging element 33 to image the image light transmitted through the variable wavelength interference filter 32 (step S33).

Next, the calibration unit 346 determines whether or not the light quantity of each imaging pixel received with the imaging element 33 is within the reference range (step S34). For example, in a case where the reference object 39 is a wavelength absorption plate and the light absorption rate thereof with respect to the target wavelength is higher than other wavelengths, the calibration unit 346 determines whether or not the light quantity for each imaging pixel is equal to or lower than a predetermined first threshold. Alternatively, in a case where the reference object 39 having the reflection rate with respect to the target wavelength higher than the other wavelengths is used, the calibration unit 346 determines whether or not the light quantity of each imaging pixel is equal to or higher than a predetermined second threshold.

In a case where the determination result in step S34 is Yes, the calibration unit 346 determines that the variable wavelength interference filter 32 is normally driven (step S35).

In a case where the determination result in step S34 is No, the wavelength switching unit 343 adjusts the command value to be input to the gap changing unit 323 to be set within a predetermined range, and searches the command value in which the light quantity of each pixel is within the reference range (step S36). The searched command value is recorded in the drive table, and corrected and updated (step S37).

After steps S35 and S37, the wavelength switching unit 343 adds 1 to the variable i (step S38) and determines whether or not the variable i is the maximum value I (step S39). In the case where the determination result in step S39 is No, the process returns to step S32. That is, in a case where it is determined that the variable wavelength interference filter 32 is normally driven and the wavelength deviates with respect to each target wavelength recorded in the drive table, the drive table is corrected so that the light of the target wavelength is transmitted through.

When the determination result in step S39 is Yes, the calibration process of the spectroscopic camera 30 ends and replies the completion of calibration to the robot controller 50 (step S4).

Next, the first transport control unit 511 of the robot controller 50 drives the belt conveyor 10 and controls the first transport arm 20 to pick up the display panel P and place the display panel P on the pedestal portion 11 (step S5). The transport operation of the display panel P is sequentially performed, and a plurality of the display panels P are sequentially sent to the spectroscopic camera 30 side.

When the pedestal portion 11 is moved to the imaging range of the imaging element 33, the robot controller 50 commands the vision controller 60 to perform the inspection of the display panel P (step S6).

When the inspection of the display panel P is commanded, the spectroscopic control unit 611 of the vision controller 60 controls the spectroscopic camera 30 and images the spectroscopic image (step S7; spectroscopic image step).

Figure 6:
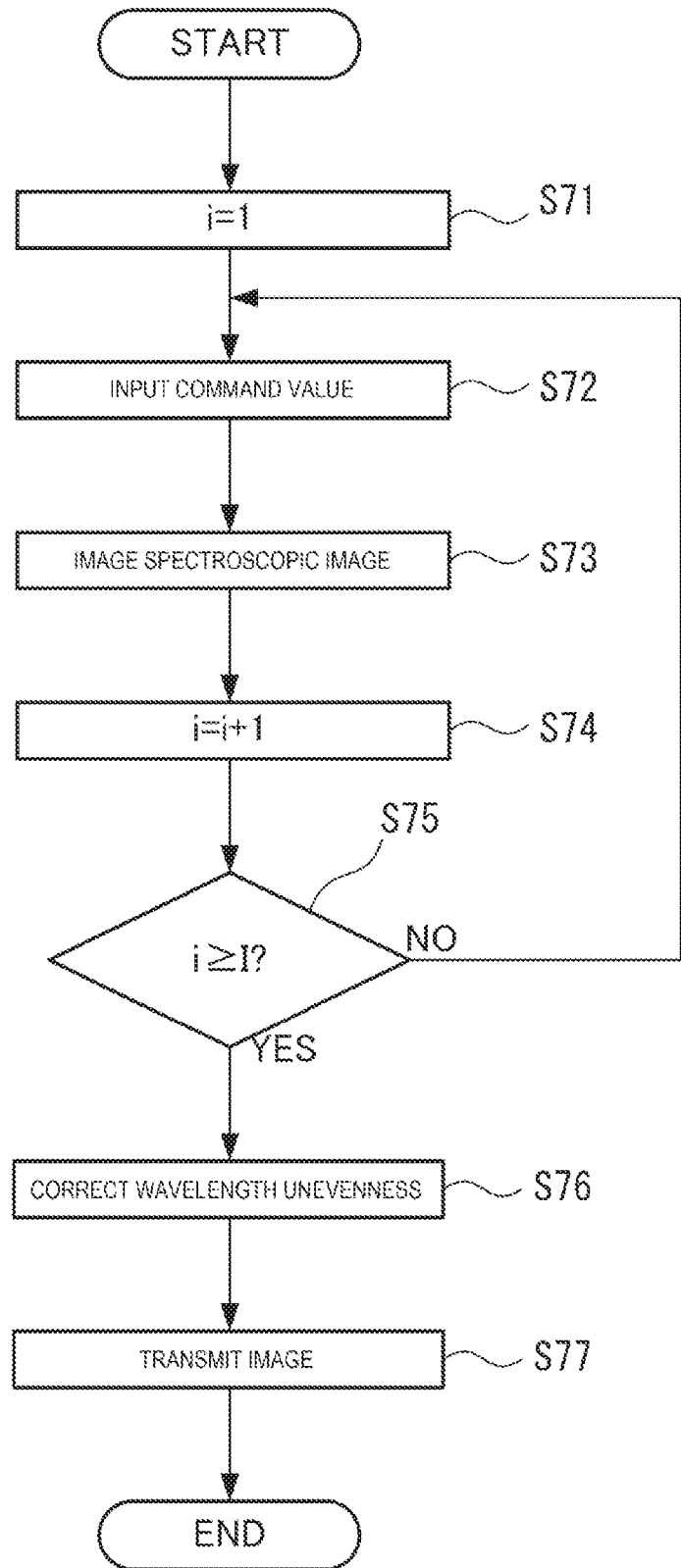
FIG. 6 is a flowchart showing a process of step S7 in FIG. 4.

FIG. 6 is a flowchart showing the imaging process of the spectroscopic image in step S7.

In the imaging process of the spectroscopic image, the wavelength switching unit 343 first initializes (i=1) the variable i (step S71).

The wavelength switching unit 343 reads the command value corresponding to the variable i from the drive table and inputs the command value to the gap changing unit 323 of the variable wavelength interference filter 32 (step S72).

Furthermore, the imaging control unit 344 controls the imaging element 33 to image the image light transmitted through the variable wavelength interference filter 32 (step S73).

Next, the wavelength switching unit 343 adds 1 to the variable i (step S74) and determines whether or not the variable i is the maximum value I (step S75). In the case where the determination result in step S75 is No, the process returns to step S72. That is, the spectroscopic image with respect to the plurality of wavelengths (target wavelength) set in advance is imaged.

When the determination result in step S75 is Yes, the wavelength unevenness correction unit 345 corrects the signal value of each pixel of each spectroscopic image to the signal value corresponding to the target wavelength of the spectroscopic image. That is, the wavelength unevenness of each spectroscopic image is corrected (step S76).

The microcontroller 34 of the spectroscopic camera 30 transmits the spectroscopic image with respect to each target wavelength obtained as described above to the vision controller 60 (step S77).

In the vision controller 60, when the spectroscopic control unit 611 acquires the spectroscopic image with respect to each target wavelength from the spectroscopic camera 30, each spectroscopic image is stored in the second memory 62.

Next, the shape inspection unit 612 reads the spectroscopic image to be used in the shape inspection from the second memory 62 among the plurality of spectroscopic images (step S8). In the present embodiment, the spectroscopic image having the shortest wavelength is used in shape inspection.

The shape inspection unit 612 performs an edge detection process based on the read spectroscopic image and determines whether or not there is a defect having a size equal to or larger than a predetermined size (third threshold) (step S9; shape inspection step). As an edge detection process, as described above, the edge may be detected based on the difference in luminance value between adjacent pixels, or the edge may be detected by the application of the Laplacian filter or by the use of the Canny method.

In the case where the determination result in step S9 is Yes, that is, in the case where a defect is found in the display panel P, the inspection result information indicating that there is a shape defect of the display panel P is generated (step S10).

In the case where the determination result in step S9 is No, that is, in the case where the shape inspection unit 612 determines that the display panel P has no defect, the color inspection unit 613 reads the spectroscopic image corresponding to each target wavelength from the second memory 62 and generates the display image (step S11).

In the generation of the display image, as described above, the color inspection unit 613 generates an image which expresses each pixel with color information of the predetermined color system (L*a*b*color system) using the signal value (spectral information) of each pixel of each spectroscopic image.

Thereafter, the color inspection unit 613 performs a color inspection process based on the color information of each pixel calculated at the image generation in step S10 and determines whether or not there is a color abnormality (step S12; color inspection step).

In the color inspection process, the color inspection unit 613 calculates an average value of the color information of each pixel and determines whether or not the average value is within the predetermined first allowable range. That is, the color inspection unit 613 determines whether or not the individual difference of the individual display panel P is within the allowable value. Here, in a case where the average value on the color information is out of the first allowable range, the color inspection unit 613 determines that there is an abnormality in color reproducibility of the display panel P (first color abnormality).

In the color inspection, the color inspection unit 613 further calculates the color difference ΔE between the color information of each pixel and the reference color information of the pattern image displayed on the display panel P, and determines whether or not the color difference ΔE is within a predetermined second allowable range. That is, the presence or absence of the color unevenness in the display panel P is determined. Here, in a case where the color difference is out of the second allowable range, the color inspection unit 613 determines that there is color unevenness in the display panel P (second color abnormality).

In the case where the color inspection unit 613 determines that there is at least one of the first color abnormality and the second color abnormality (in the case where the determination result in step S12 is Yes), the color inspection unit 613 generates the inspection result information indicating that there is the color abnormality (step S13). The inspection result information includes the type of color abnormality (either one of or both first color abnormality and second color abnormality) and the degree of the color abnormality (such as average value of color information and color difference ΔE of each pixel).

In step S12, in a case where the determination result is No (in a case where there is no color abnormality), the inspection result information including information indicating that the display panel P is normal (good product), each spectroscopic image, and the display image is generated (step S14).

Thereafter, the vision controller 60 transmits the generated inspection result information, each spectroscopic image imaged in step S7, and the display image to the robot controller 50 (step S15).

When the robot controller 50 receives the inspection result information, the spectroscopic image, and the display image from the vision controller 60, the display control unit 514 displays the received spectroscopic image and the display image on a predetermined display. The robot controller 50 transmits the acquired inspection result information to the core system 100. Accordingly, the core system 100 stores the transmitted inspection result information in a predetermined data storage device as the inspection log.

The second transport control unit 513 of the robot controller 50 controls the operation of the second transport arm 40 based on the received inspection result information.

To this, the second transport control unit 513 first determines whether or not the inspection result information including the shape inspection result on the shape defective product is received (step S16).

In the case where the determination result in step S16 is Yes, the second transport control unit 513 picks up the display panel P by the second transport arm 40, and transports the display panel P to the first transport portion 10B (step S17). In step S9, when the inspection result information indicating a shape defective product is generated, the process from step S11 to step S14 is omitted and the inspection result information is transmitted in step S15. Accordingly, in the case where the display panel P has a shape defect and is determined to be a defective product, the display panel P is immediately transported from the first transport portion 10B to the collection position for the defective product.

In the case where the determination result is No in step S16, the second transport control unit 513 determines whether or not at least one of the first color abnormality and the second color abnormality of the color inspection result is included in the inspection result information (step S18).

In the case where the determination result in step S18 is Yes, the second transport control unit 513 picks up the display panel P with the second transport arm 40 and transports the display panel P to the second transport portion 10C (step S19). Accordingly, the display panel P determined to have the color abnormality is transported from the second transport portion 10C to the correction unit 70.

At this time, the robot controller 50 transmits the inspection result information to the correction unit 70. Accordingly, the correction unit 70 can correct the display color of the display panel P according to the type of the color abnormality.

In the case where the determination result is No in step S18, that is, in the case where no shape defect nor color abnormality is detected, the second transport control unit 513 transports the display panel P as it is along the inspect transport portion 10A (step S20). Accordingly, the display panel P which is a good product is transported to the next process line (for example, rapping process).

Operation and Effect of Present Embodiment

In the inspection line 1 of the present embodiment, the display panel P is imaged as the inspection object, and the light from the predetermined imaging range of the display panel P is spectroscopically separated into a plurality of wavelengths and the spectroscopic images of each of the wavelengths are imaged by the spectroscopic camera 30. The shape inspection unit 612 of the vision controller 60 performs the shape inspection process for inspecting the shape of the display panel P using the spectroscopic image of a predetermined wavelength from these imaged spectroscopic images. The color inspection unit 613 of the vision controller 60 performs the color inspection process for inspecting the display color of the display panel P using a plurality of spectroscopic images imaged with the spectroscopic camera 30.

In the present embodiment, since the spectroscopic image of the self-illuminated display panel P as an inspection object is imaged, in a case where there is a shape defect on the surface of the inspection object, the luminance value of the spectroscopic image changes due to the scattering of light. Therefore, the shape inspection unit 612 does not need to emit illumination light having a specific pattern such as a fringe pattern, and can easily perform the shape inspection using any spectroscopic image imaged as the color inspection. In the color inspection, since the spectrum of each pixel is obtained from the spectroscopic image of the plurality of wavelengths, it is possible to detect the color abnormality for each pixel with high accuracy.

That is, in the present embodiment, it is possible to perform both the shape inspection by the shape inspection unit 612 and the color inspection by the color inspection unit 613 based on the measurement result obtained by a single spectroscopic camera 30. Therefore, it is not necessary to acquire an image for performing the shape inspection and an image for performing the color inspection in separate processes, and thereby, it is possible to reduce the number of processes related to the inspection.

In the inspection line 1 of the present embodiment, the spectroscopic camera 30 includes the variable wavelength interference filter 32 and the imaging element 33 for imaging an image of the light transmitted through the variable wavelength interference filter.

A spectroscopic filter such as AOTF or LCTF can be used as a spectroscopic filter used in the spectroscopic camera 30. However, in this case, the spectroscopic camera 30 increases in size, and it is necessary to secure a disposition space in the inspection line 1. On the other hand, in the present embodiment, the spectroscopic camera 30 which spectroscopically separates the incident light by the variable wavelength interference filter 32. Such a variable wavelength interference filter 32 is superior in thickness reduction, miniaturization, and weight saving compared to the AOTF or the LCTF, so that it is possible to reduce the size and weight of the spectroscopic camera 30. Accordingly, it is possible to improve the freedom degree of the disposition space of the spectroscopic camera 30, and it is possible to dispose the spectroscopic camera 30 at any position in a manufacturing factory and the like.

In the present embodiment, the first transport arm 20 and the second transport arm 40 for transporting the display panel P are provided, and the driving of the first transport arm 20 and the second transport arm 40 is controlled by the robot controller 50. The vision controller 60 which controls the spectroscopic camera 30 is provided.

That is, in the present embodiment, a control mechanism (robot controller 50) for controlling the robot such as the first transport arm 20 and the second transport arm 40 and a control mechanism (vision controller 60) for controlling the spectroscopic camera 30 to perform the inspection are configured separately. Accordingly, the versatility of the inspection apparatus can be enhanced. For example, the vision controller 60 can also be applied to the inspection lines of different types of the display panels P and can also be applied to various other manufacturing lines other than the display panel P.

In the present embodiment, in the case where the display panel P has a shape defect, the robot controller 50 transports the display panel P to the first transport portion 10B which transports the display panel P to the collection position of the defective product based on the inspection result information input from the vision controller 60. In the case where the display panel P has the color abnormality, the robot controller 50 transports the display panel P to the second transport portion 10C which transports the display panel P to the correction unit 70 which performs the color correction. In a case where the display panel P is normal (good product), the robot controller 50 transports the display panel P to the next process line by the inspect transport portion 10A (third transport portion).

Accordingly, the robot controller 50 can quickly transport the display panel P to an appropriate position and sort out the display panel P efficiently according to the inspection result information.

The color correction is performed on the display panel P transported by the second transport portion 10C by the correction unit 70, and the image of the display panel P can be corrected to a correct color. Therefore, the correctable display panel P is not collected as a defective product, and thereby the yield can be improved.

In the inspection line 1 of the present embodiment, the reference object 39 which performs the calibration of the spectroscopic camera 30 is provided. Accordingly, it is possible to examine whether or not the spectroscopic camera 30 is appropriately driven before the inspection of the display panel P.

In the present embodiment, the shape inspection unit 612 performs the shape inspection using the spectroscopic image having the shortest wavelength among the plurality of spectroscopic images.

By using such a spectroscopic image, since an intensive scattered light is generated in the case where unevenness such as a scratch is on the surface of the display panel P, it is possible to detect the unevenness with high accuracy and to enhance the accuracy of the shape inspection.

Second Embodiment

Next, a second embodiment will be described.

In the first embodiment, an example in which the spectroscopic camera 30 is fixed at a predetermined position capable of imaging an image of the display panel P transported by the belt conveyor 10 is described. On the other hand, in the second embodiment, it is different from the first embodiment in that the spectroscopic camera 30 is fixed to a robot arm.

In the following description, the same reference numerals are attached to the items already described, and the description thereof is omitted or simplified.

Figure 7:
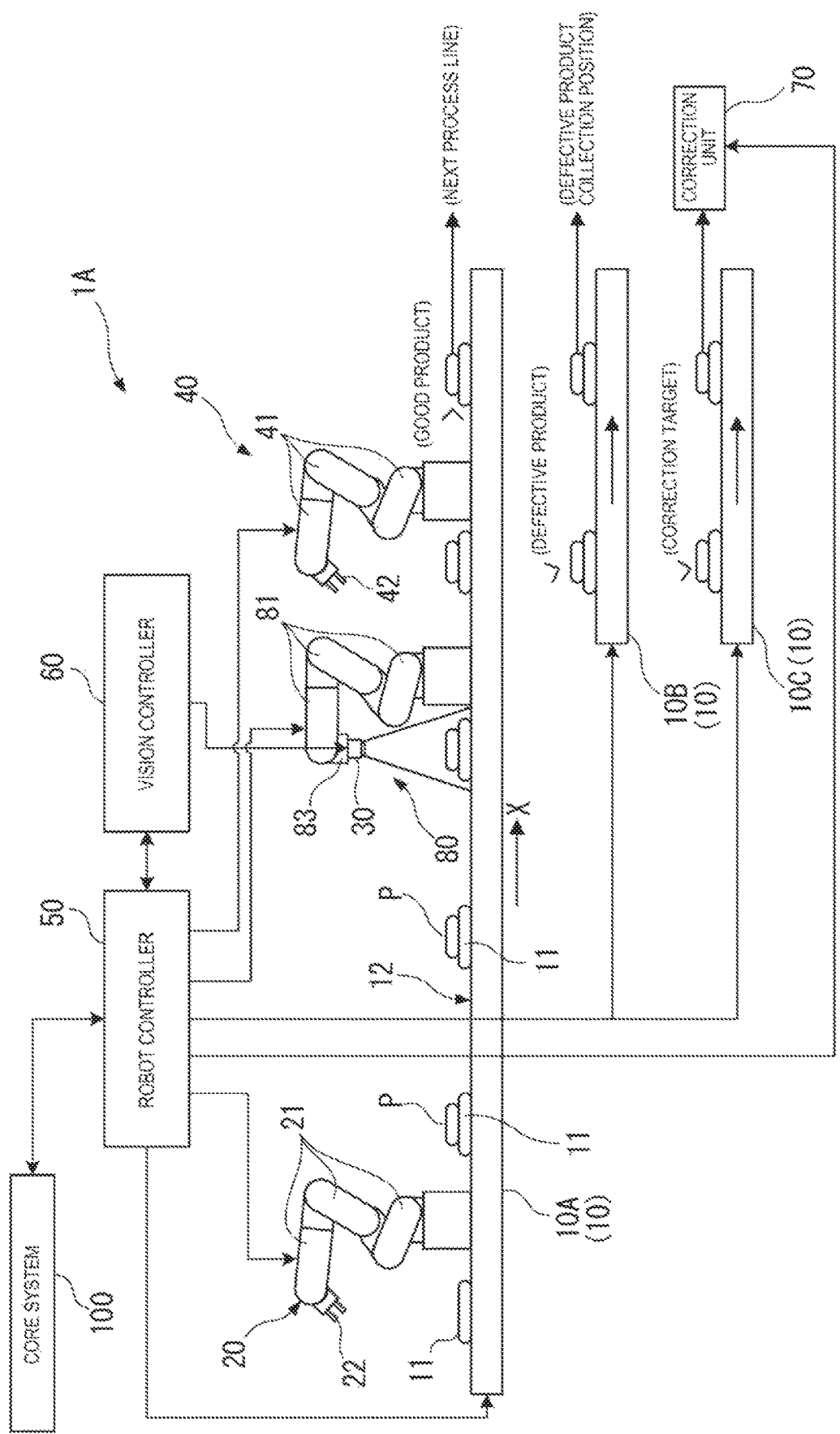
FIG. 7 is a view showing a schematic configuration of an inspection line of a second embodiment.

FIG. 7 is a view showing a schematic configuration of an inspection line 1A of the second embodiment.

As shown in FIG. 7, the inspection line 1A of the second embodiment includes the belt conveyor 10, the first transport arm 20, the spectroscopic camera 30, the second transport arm 40, the robot controller 50, and the vision controller 60 as in the first embodiment. The inspection line 1A of the present embodiment is further provided with a vision arm 80 to which the spectroscopic camera 30 is fixed.

The vision arm 80 (imaging holding arm) is, for example, an articulated robot arm in which a plurality of arm portions 81 are rotatably connected to each other similarly to the first transport arm 20 and the second transport arm 40, and the spectroscopic camera 30 is fixed to a camera holding portion 83 (imaging holding portion) provided at the tip end portion of the arm portions 81. Accordingly, in the present embodiment, the driving of the vision arm 80 is controlled by the robot controller 50 so that the spectroscopic camera 30 is relatively movable with respect to the display panel P.

Figure 8:
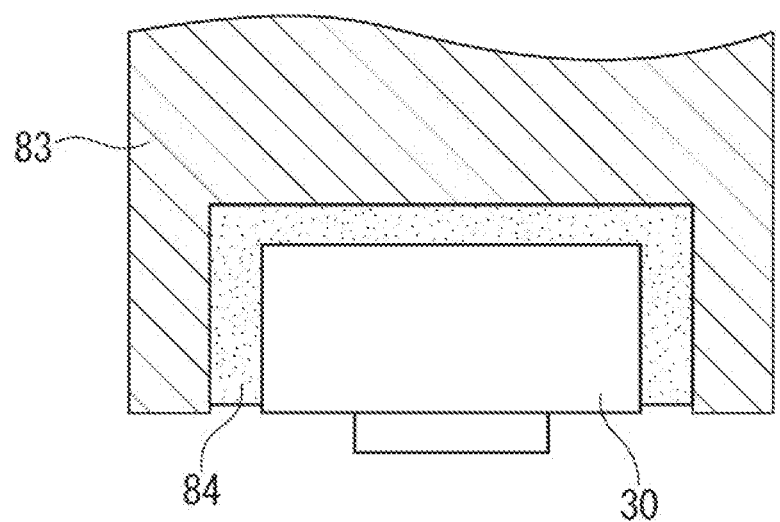
FIG. 8 is a schematic sectional view of a vicinity of a spectroscopic camera of a vision arm of the second embodiment.

FIG. 8 is a schematic sectional view of a holding position of the spectroscopic camera 30 on the vision arm 80. In the present embodiment, the spectroscopic camera 30 is fixed to the camera holding portion 83 provided at the tip end of the vision arm 80 via a buffer material 84. As a buffer material 84, for example, an elastic member such as rubber can be used.

In such a configuration, it is possible to suppress the vibration generated when the vision arm 80 is driven from being transmitted to the spectroscopic camera 30. Accordingly, the inconvenience of the gap between the pair of reflection films 321 and 322 at the variable wavelength interference filter 32 fluctuating due to the vibration is suppressed, and it is possible to image a spectroscopic image with high accuracy.

In the present embodiment, when imaging a spectroscopic image of the display panel P, the robot controller 50 controls the driving of the vision arm 80 and moves the position of the spectroscopic camera 30 so that the display panel P is placed within the imaging range.

In the second embodiment, the configuration is the same as that of the first embodiment except that the spectroscopic camera 30 is provided at the vision arm 80, and it is possible to inspect the display panel P by the same inspection method as the first embodiment.

Operation and Effect of Present Embodiment

In the present embodiment, the vision arm 80 is provided at the inspection line 1, and the spectroscopic camera 30 is held by the vision arm 80.

Therefore, it is possible to move the spectroscopic camera 30 with respect to the display panel P, and it is possible to image an image of the display panel P from any directions. For example, not only an image display region of the display panel P but also the side surface of the display panel P can be imaged with the spectroscopic camera 30 and it is possible to inspect an abnormality such as a defect in a region other than the image display region of the display panel P.

The spectroscopic camera 30 is fixed to the camera holding portion 83 of the vision arm 80 via the buffer material 84. Therefore, the transmission of the vibration from the vision arm 80 is suppressed by the buffer material 84, the blur of the image imaged by the spectroscopic camera 30, the wavelength shifting due to the gap fluctuation of the variable wavelength interference filter 32, and the like can be suppressed, and thereby a spectroscopic image with high accuracy can be obtained.

Third Embodiment

Next, a third embodiment will be described.

In the first embodiment and the second embodiment, the spectroscopic camera 30 and the second transport arm 40 are separate portions, and after a spectroscopic image is imaged by the spectroscopic camera 30, the display panel P is transported to the predetermined position by the second transport arm 40. On the other hand, the third embodiment is different from the above-described embodiments in that the spectroscopic camera 30 is held by a transport arm which transports the display panel P.

Figure 9:
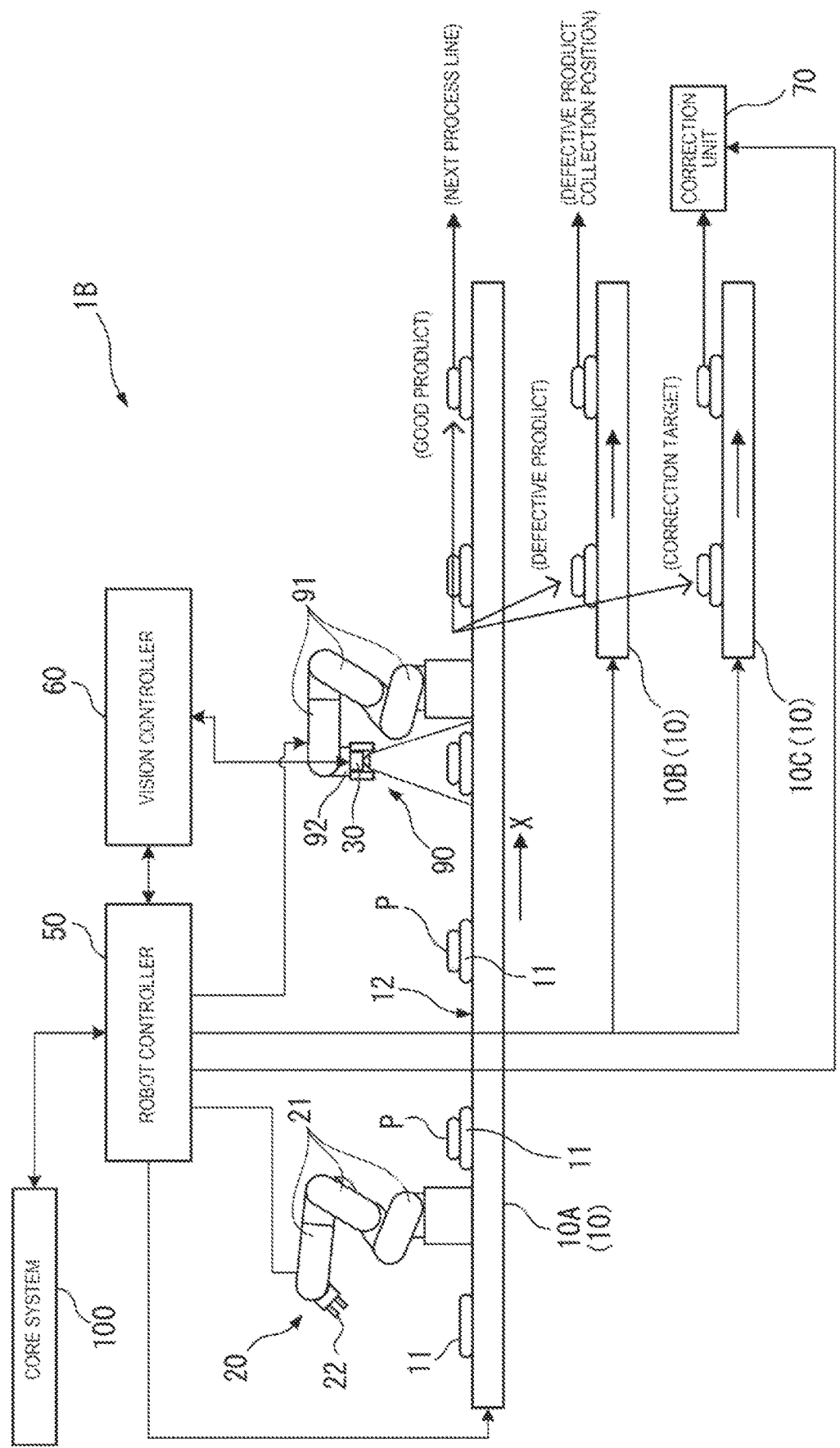
FIG. 9 is a view showing a schematic configuration of an inspection line of a third embodiment.
Figure 10:
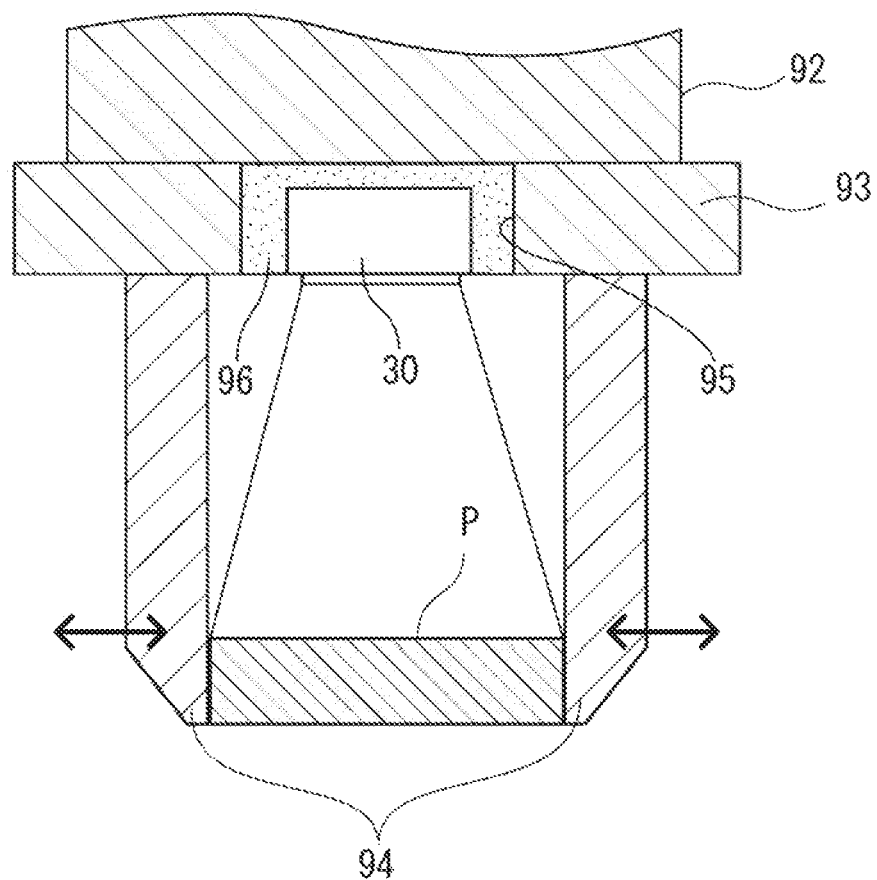
FIG. 10 is a schematic sectional view of a pick-up portion of a third transport arm of the third embodiment.

FIG. 9 is a view showing a schematic configuration of an inspection line 1B of the third embodiment. FIG. 10 is a sectional view showing a schematic configuration of a pick-up portion 92 of a third transport arm 90.

As shown in FIG. 9, in the inspection line 1B of the present embodiment, the third transport arm 90 is provided instead of the spectroscopic camera 30 (fixed type) of the first embodiment and the second transport arm 40.

The third transport arm 90 is an articulated robot arm in which a plurality of arm portions 91 are rotatably connected to each other similarly to the first transport arm 20 and the second transport arm 40, and the pick-up portion 92 which picks up the display panel P is provided at the tip end portion of the arm portions 91.

The pick-up portion 92 includes, for example, a base 93 and a gripping portion 94 on which the base 93 is provided as shown in FIG. 10.

The gripping portion 94 is provided as a pair in a forward and backward movable manner in a direction approaching and separating from each other, holds and transports the display panel P by the control of the robot controller 50.

On the base 93, when the display panel P is gripped between the pair of gripping portions 94, that is, by the gripping portion 94, a recessed portion 95 (imaging holding portion) is provided at a position opposed to the display panel P. The spectroscopic camera 30 is held in the recessed portion 95 via a buffer material 96. As a buffer material 96, similar to the second embodiment, an elastic member such as rubber can be used.

In the present embodiment, when the display panel P is gripped by the third transport arm 90, the spectroscopic image of the plurality of target wavelengths with respect to the display panel P is imaged by the spectroscopic camera 30. Based on the spectroscopic image, the processes in steps S8 to S15 of the first embodiment are performed to perform the shape inspection and the color inspection of the display panel P. Based on the inspection result information, the robot controller 50 drives the third transport arm 90 and transports the display panel P to any one of the inspect transport portion 10A, the first transport portion 10B, and the second transport portion 10C.

Operation and Effect of Present Embodiment

In the present embodiment, the third transport arm 90 which transports (sorts out) the display panel P to any one of the inspect transport portion 10A, the first transport portion 10B, and the second transport portion 10C is provided. The third transport arm 90 includes the gripping portion 94 which grips the display panel P and the recessed portion 95 positioned opposite to the display panel P gripped by the gripping portion 94, and the spectroscopic camera 30 is held in the recessed portion 95.

In such a configuration, it is possible to perform the imaging process of the spectroscopic image by the spectroscopic camera 30 and the shape inspection and the color inspection based on the imaged spectroscopic image in the middle of transporting the display panel P by the third transport arm 90. Therefore, as in the first embodiment and the second embodiment, after imaging the spectroscopic image by the spectroscopic camera 30 and performing the inspection process, the display panel P can be more quickly sorted out to the predetermined position compared to the case where the display panel P is picked up and transported by the second transport arm 40.

The spectroscopic camera 30 is held in the recessed portion 95 via the buffer material 96. Therefore, in the middle of transporting the display panel P by the third transport arm 90, even in the case where the spectroscopic image is imaged by the spectroscopic camera 30, the vibration from the third transport arm 90 is hardly transmitted to the spectroscopic camera 30. Therefore, it is possible to suppress the degradation of the spectral accuracy in the spectroscopic camera 30.

Fourth Embodiment

Next, a fourth embodiment will be described.

In the first embodiment, the shape inspection unit 612 performs the shape inspection based on the spectroscopic image having the shortest wavelength among the plurality of spectroscopic images. On the other hand, the spectroscopic image when performing the shape inspection in the third embodiment is different from the first embodiment.

That is, the shape inspection unit 612 of the present embodiment performs the shape inspection process based on the spectroscopic image having a wavelength at which the light emission amount is maximum (peak) when the display panel P is self-illuminated. In the display panel P, the wavelength at which the light emission amount is maximum is determined by the type of the backlight and the like. Accordingly, it may be stored in the second memory 62 of the vision controller 60 in advance. The shape inspection unit 612 may select a spectroscopic image having the maximum average luminance or select a spectroscopic image having the maximum luminance value by comparing the maximum luminance value of each the spectroscopic images among the plurality of imaged spectroscopic images.

The shape inspection process method and other inspection process and the transport of the display panel P are the same as the first embodiment.

Operation and Effect of Present Embodiment

In the present embodiment, the shape inspection unit 612 performs the shape inspection based on the spectroscopic image corresponding to the wavelength having the maximum light emission amount on the display panel P. In such a peak wavelength, the light quantity of the light received by the spectroscopic camera 30 increases, so that in the case where the scattering of light occurs, the light quantity of the scattered light also increases. Therefore, the shape inspection unit 612 can detect the unevenness on the surface of the display panel P with high accuracy.

MODIFICATION EXAMPLES

The invention is not limited to the above-described embodiments, and variations, improvements, and the like within the scope of attaining the object of the invention are included in the invention.

Modification Example 1

In the first to fourth embodiments, an example that the shape inspection unit 612 detects the unevenness such as a scratch based on a spectroscopic image is described, but the invention is not limited thereto. The shape inspection unit 612 may further detect a foreign substance attached to the display panel P. For example, the shape inspection unit 612 may extract spectroscopic images within a wavelength range from near-infrared light to infrared light among the plurality of spectroscopic images imaged by the spectroscopic camera 30 and specify the component and the type of the foreign substance by measuring the absorption spectrum of the foreign substance.

In this case, the shape inspection unit 612 can determine whether the shape abnormality of the display panel P is caused by a defect such as a scratch or adhesion of a foreign substance. The robot controller 50 can transport the display panel P to separate lines (belt conveyor) in the case where the display panel P has a defect and in the case where a foreign substance is attached on the display panel P according to the shape inspection result. For example, in the case where the display panel P has a scratch, similar to the above-described embodiment, the display panel P is transported to the first transport portion 10B which transports the display panel P to the defect collection position. In the case where a foreign substance is attached on the display panel P, the robot controller 50 controls the second transport arm 40 to transport the display panel P on a belt conveyor heading to a washing device for washing the display panel P.

Modification Example 2

In the third embodiment, a second camera capable of imaging an image other than the surface of the display panel P may further be included in addition to the third transport arm 90. As a second camera, for example, a fixed type spectroscopic camera like the first embodiment and a spectroscopic camera held by a vision arm like the second embodiment can be exemplified. As a second camera, an RGB camera may be used and a light source which irradiates the image target with the illumination light may be provided.

In this case, when the display panel P is transported by the third transport arm 90, the fixed spectroscopic camera or the spectroscopic camera held in the vision arm can image a spectroscopic image of the rear surface of the display panel P or the shape inspection of the outer case of the display panel P and the like can be simultaneously performed.

Modification Example 3

In the first to fourth embodiments, an example in which the variable wavelength interference filter 32 is installed in the spectroscopic camera 30 is described, but the invention is not limited thereto. The AOTF, the LCTF, and the like can be used as a spectroscopic element which spectroscopically separates the light from the display panel P in addition to the above-described variable wavelength interference filter 32.

Modification Example 4

In the second embodiment, an example in which the spectroscopic camera 30 is held by the vision arm 80 is described, but it is not limited to such a robot arm. For example, a slide member movable along the first transport direction X may be provided to hold the spectroscopic camera 30 by the slide member.

Modification Example 5

An example in which the display panel P is gripped by the pair of gripping portions 94, the recessed portion 95 which holds the spectroscopic camera 30 is provided between these gripping portions 94, and the display panel P is imaged from the normal direction in the third transport arm 90 is described, but it is not limited thereto.

For example, the pick-up portion 92 may absorb and pick up the display panel P. The spectroscopic camera 30 may be held at an angle in which the imaging direction is inclined with respect to the normal line of the display panel P.

Other Modification Example

In the above-described embodiments, an example in which the robot controller 50 and the vision controller 60 are separately provided is described, but, for example, it may be integrated.

In the above-described embodiments, an example in which the display panel P is used as a target object is described, but it is not limited thereto. For example, the target object may be a light-transmitting member such as a film, and a light source may be provided on the pedestal portion 11. In this case, the light from the light source is transmitted through the target object and imaged by the spectroscopic camera 30. In the configuration, there is no need to provide an illumination light source such as a fringe pattern in the spectroscopic camera 30. In a case where there is a shape defect such as a scratch in the target object when the light of the light source provided on the pedestal portion 11 is transmitted through the target object, the light is scattered at the defect. Therefore, similar to the above-described embodiments, a spectroscopic image can be used to preferably inspect the shape abnormality of the target object. The color inspection of the target object can be performed based on the spectroscopic image of the plurality of wavelengths.

In the above-described embodiments, an example in which the display panel P is transported to the next process line as it is by the inspect transport portion 10A along the first transport direction X in a case where the display panel P is a good product. However, the display panel P may be transported on a belt conveyor (third transport portion) different from the inspect transport portion 10A and transported to the next process line.

An example in which the microcontroller 34 of the spectroscopic camera 30 functions as the wavelength unevenness correction unit 345 is described, but the function may not be installed. For example, the wavelength unevenness data is stored in the second memory 62, and the vision controller 60 may perform the correction of the wavelength unevenness in the plurality of spectroscopic images received from the spectroscopic camera 30.

In the first embodiment, an example in which processes in steps from S11 to S14 are omitted in a case where the determination result in step S9 is Yes (display panel P is determined to have shape defect) is described. On the other hand, even in the case where the determination result in step S9 is Yes, the processes in steps from S11 to S14 may be performed. Alternatively, even in the case where the determination result in step S9 is Yes, the display image generation process of step S11 may be performed and the processes in steps from S12 to S14 may be omitted.

The specific structure at the time of practicing the invention can be appropriately changed to other structures or the like within a range that can achieve the object of the invention.

What is claimed is:

1. An inspection method for causing a processor to execute a program stored in a memory, the method comprising executing on the processor the steps of:
   spectroscopically separating light from a predetermined imaging range of an inspection object into light of a plurality of wavelengths and imaging spectroscopic images of each of the wavelengths;
   inspecting a shape of the inspection object using the spectroscopic image of a predetermined wavelength among the wavelengths imaged in the imaging of the spectroscopic images of each of the wavelengths; and
   inspecting a color of the inspection object using the spectroscopic images of each of the wavelengths imaged,
   wherein the predetermined wavelength is determined so that a maximum light quantity of the light from the inspection object in the corresponding spectroscopic image at the predetermined wavelength is equal to or higher than maximum light quantities in the other spectroscopic images at the other wavelengths.

2. An inspection apparatus comprising:
   a spectroscopic image sensor component configured to spectroscopically separate light from a predetermined imaging range of an inspection object into light of a plurality of wavelengths and image spectroscopic images of each of the wavelengths;
   a memory configured to store a program; and
   a processor configured to execute the program so as to:
      inspect a shape of the inspection object using the spectroscopic image of a predetermined wavelength among the wavelengths; and
      inspect a color of the inspection object using the spectroscopic images of each of the wavelengths, wherein the predetermined wavelength is determined so that a maximum light quantity of the light from the inspection object in the corresponding spectroscopic image at the predetermined wavelength is equal to or higher than maximum light quantities in the other spectroscopic images at the other wavelengths.

3. A computer readable non-transient medium storing instructions to cause one or more processors to:
cause a spectroscopic image sensor component to spectroscopically separate light from a predetermined imaging range of an inspection object into light of a plurality of wavelengths and image spectroscopic images of each of the wavelengths;
inspect a shape of the inspection object using the spectroscopic image of a predetermined wavelength among the wavelengths; and
inspect a color of the inspection object using the spectroscopic images of each of the wavelengths,
wherein the predetermined wavelength is determined so that a maximum light quantity of the light from the inspection object in the corresponding spectroscopic image at the predetermined wavelength is equal to or higher than maximum light quantities in the other spectroscopic images at the other wavelengths.

* * * * *